(12) United States Patent
Kuissi et al.

(10) Patent No.: US 7,028,454 B2
(45) Date of Patent: Apr. 18, 2006

(54) DRUM CLUTCH SLIPPAGE SYSTEM

(75) Inventors: Hyppolite Kuissi, East Moline, IL (US); Michael Horejsi, Sherrard, IL (US); Zhimin Tan, Davenport, IA (US)

(73) Assignee: CNH America LLC, New Holland, PA (US)

( * ) Notice: Subject to any disclaimer, the term of this patent is extended or adjusted under 35 U.S.C. 154(b) by 122 days.

(21) Appl. No.: 10/814,092

(22) Filed: Mar. 30, 2004

(65) Prior Publication Data

US 2005/0217960 A1    Oct. 6, 2005

(51) Int. Cl.
*A01D 46/08*    (2006.01)
*F16D 43/208*    (2006.01)

(52) U.S. Cl. .................. 56/10.3; 192/30 W; 192/56.1; 324/207.25; 464/37

(58) Field of Classification Search ................. 56/10.3; 340/440; 464/1
See application file for complete search history.

(56) References Cited

U.S. PATENT DOCUMENTS

| | | | |
|---|---|---|---|
| 3,786,776 A * | 1/1974 | Buthe et al. ............. | 192/30 W |
| 3,936,754 A * | 2/1976 | Minami ...................... | 307/116 |
| 4,255,946 A * | 3/1981 | Hansen ........................ | 464/36 |
| 4,282,702 A | 8/1981 | McBee ........................ | 56/10.3 |
| 4,306,403 A | 12/1981 | Hubbard et al. ............. | 56/10.3 |
| 4,458,226 A * | 7/1984 | Cho ............................ | 335/205 |
| 4,592,249 A | 6/1986 | Lehmann et al. .......... | 74/473 R |
| 4,597,480 A | 7/1986 | Schwarz ..................... | 192/54 |
| 4,949,828 A | 8/1990 | Olsen ....................... | 192/84 R |
| 5,343,675 A | 9/1994 | Norton .................... | 56/10.2 R |
| 5,621,317 A | 4/1997 | Wozniak ................. | 324/207.13 |
| 5,947,246 A | 9/1999 | Koller ....................... | 192/56.1 |
| 6,318,056 B1 | 11/2001 | Rauch et al. ............. | 56/10.2 J |
| 6,339,325 B1 * | 1/2002 | Oda et al. .............. | 324/207.22 |
| 6,481,296 B1 * | 11/2002 | Jin et al. ............... | 324/207.22 |
| 6,550,607 B1 | 4/2003 | Watson et al. .......... | 198/810.01 |
| 2002/0174640 A1 * | 11/2002 | Fox ............................. | 56/28 |
| 2004/0164731 A1 * | 8/2004 | Moreno ................. | 324/207.22 |

FOREIGN PATENT DOCUMENTS

JP    58-91933 A    *    7/1983

* cited by examiner

*Primary Examiner*—Rodney H. Bonck
(74) *Attorney, Agent, or Firm*—Michael G. Harms; John William Stader; Stephen A. Bucchianeri (57) ABSTRACT

An improved clutch slippage detection system, comprising a magnetic actuator and at least one reed switch sensor located at a slip clutch, which reed switch changes its state, at the instant the clutch begins to overrun.

2 Claims, 8 Drawing Sheets

DRUM CLUTCH SLIPPAGE SYSTEM

FIELD OF THE INVENTION

The present invention generally relates to agricultural equipment and machines, particularly, cotton harvesting machines (cotton pickers); and, more particularly, to cotton picker systems and apparatus for detecting overloads, overruns, or slow downs, at the picking drum.

BACKGROUND OF THE PRIOR ART

In conventional cotton pickers, for each row of cotton to be picked, there is provided a picker drum, which supports at least one vertical rotor assembly, which assembly consists of a plurality of radially extending, cotton-picking spindles. Each rotor, and its associated drive gears, are protected against damage by a slip clutch, which removes drive from the rotor when an overload occurs, e.g. when debris becomes lodged in the drum. That is, a rotor shaft extends downwardly through the slippable portion, or inner hub, at the center of the slip clutch, and then through the drum. The rotor drive gear is mounted to the external, driven portion, i.e. housing, of the slip clutch. As the slip clutch is driven by a conventional power source, via the drive gear, the rotor also rotates on its vertical axis, in tandem with the clutch.

During the overloaded condition, ratcheting or clicking sounds are generated as the cams and lobes on the drive and driven portions, of the gear train and clutch respectively, slip past each other. Absent a slippage detection system, an operator, seated in the cab of the cotton picker, must rely upon hearing the slipping sounds. However, he may not immediately hear the sounds because cabs tend to isolate the operator from the noise of the picker unit. This inability to immediately recognize the overload condition can result in damage to the drum and its drive, as well as reduced productivity from the loss of cotton.

Before now, the slippage detection systems measured the speed differential between the rotor assemblies of the picking drums. The drum rotor assembly normally comprises two rotor shafts per picking drum. Each rotor shaft of each drum, has a speed sensor, therefore there are 12 sensors on a 6 row machine. Each sensor measures the revolutions per minute (RPM) from its respective shaft and sends the signal to a computer processing unit that calculates the speed differential between the two shafts. A microprocessor captures the speed differential at each rotor assembly and the resulting average differential speed after comparing all six assemblies. The processor sends a fault warning if any rotor speed and/or speed differential deviates from the average by more than ±10%.

There are many factors influencing this fault warning. Typically, the shaft must spin a minimum number of RPMs before the computer processing unit can detect any degree of change. Most computer processors need a certain minimum number of cycles and time to process and validate signals from the speed sensor. Since damage continues to occur, during at least that minimum number of cycles, and during the processor cycle validation time, the delayed detection or late warning of the slippage leads to, inter alia, aggravation of the deterioration of various fine-tuned components of the harvester machines.

Identifying and repairing the damage to these fine-tuned components may exceed the troubleshooting capabilities of the average operator.

SUMMARY OF THE INVENTION

In a cotton-picking unit of a cotton harvester, or in other agricultural or construction equipment or in machine tools there can be an overrunning clutch having an input driven by rotable power and an output driven by the individual unit. The input and output are engaged such that the input and output are rotable relative to one another along the path of rotational movement when in an overrunning condition. The invention comprises negating the need for a complicated algorithm or use of a microprocessor unit to detect such overrunning condition, and generally comprises the following components of a non-contact detection system:

(a) a sensor operable in a first state when a predetermined magnetic field is absent, and operable in a second state when the predetermined magnetic field is present; and (b) a magnetic actuator mounted and operable for emitting the predetermined magnetic field; and (c) a shield disposed on the input or the output in a position for shielding the sensor from the actuator when the input and the output are jointly rotating in the normal condition, and such that when the input and the output are in the overrunning condition the shield will be at least intermittently positioned to expose the sensor to the magnetic field and to change the state of the sensor.

A principal aspect of the present invention employs a magnetic reed switching system having three components, i.e. an actuator magnet, a magnetic reed switch sensor, and a metallic shield therebetween. The state of the switch, i.e. "open" or "closed" changes by shielding or unshielding the magnetic flux between the sensor and the magnet.

In this invention, each rotor slippage can be detected independently, without the need for comparing average speed differentials to that of its neighboring rotor. Error due to speed averaging is avoided.

In yet another aspect of the invention, a strong slippage signal can be created without computer processing. Thus, the cost of this control system is only a fraction of the cost of prior art systems.

Also, the detection system of the present invention is easy to troubleshoot, allowing the operator to test and adjust a magnetic sensor by using a basic test-light, without the need to rotate the drums as fully nor to run the harvester engine at as high a risk. That is, the present invention allows fault detection within, for example, the first faulty ⅛ of a revolution and at near zero speed, as compared to the prior art systems where fault detection requires more movement and speed.

These aspects and others in their most preferred embodiment will become apparent from the following Detailed Description which will relate more detail regarding components of a detection system which comprise the following components:

(a) a drive gear, powered by the engine drive shaft and mounted to the external drive portion of the slip clutch;

(b) a magnetic actuator element also tied to said external drive portion of the slip clutch;

(c) an internal hub portion of said slip clutch, being keyed to the rotor shaft, and having a cover shield designed to intermittently shield magnetic flux emanating from the magnetic actuator; and (d) at least one magnetic reed sensor switch mounted to receive magnetic flux from the actuator unless shielded by the cover shield.

DETAILED DESCRIPTION OF THE PREFERRED EMBODIMENTS

Figure 1:
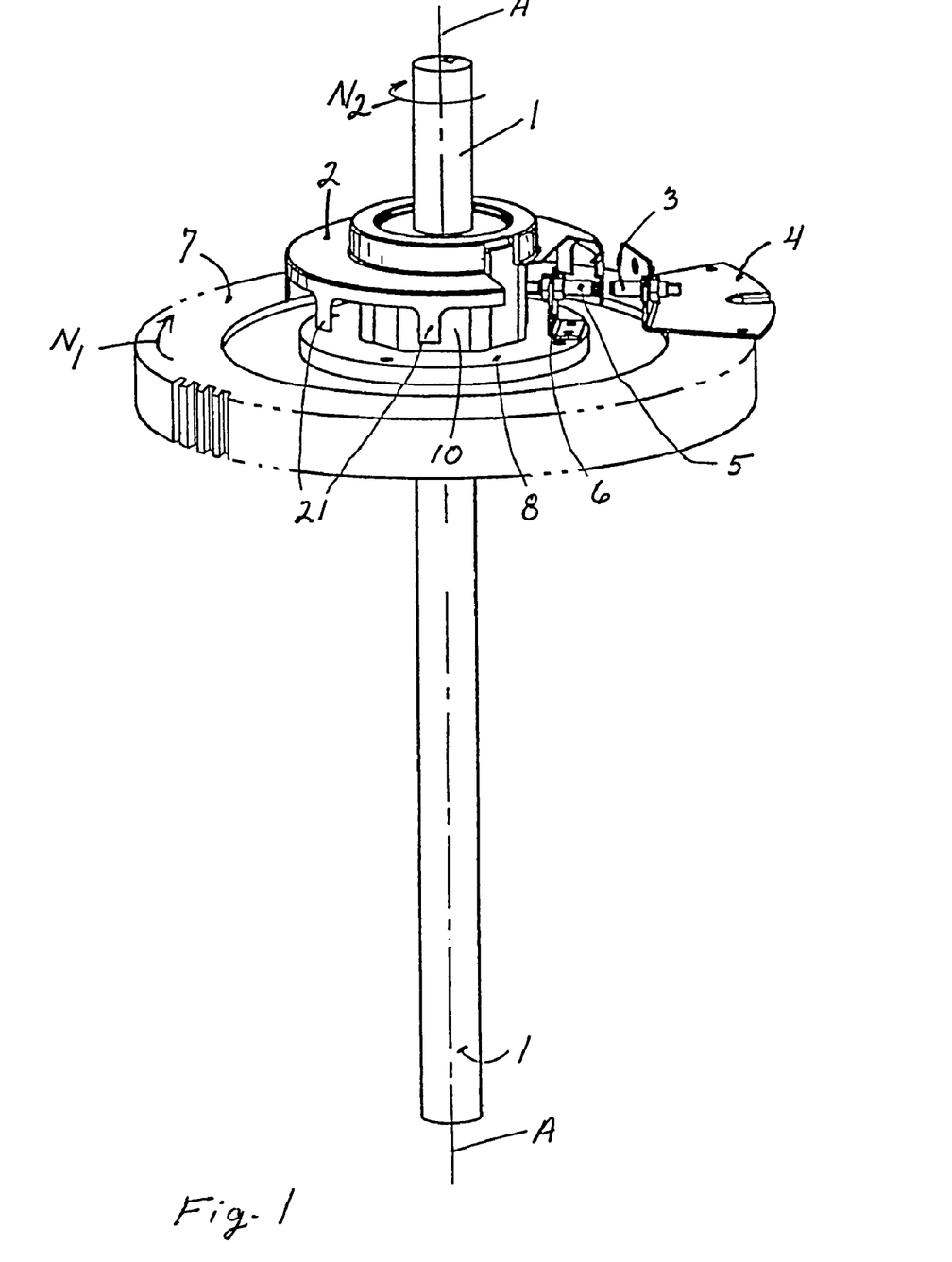
FIG. 1 is a front perspective view of the clutch slippage detection system of this invention.
Figure 2:
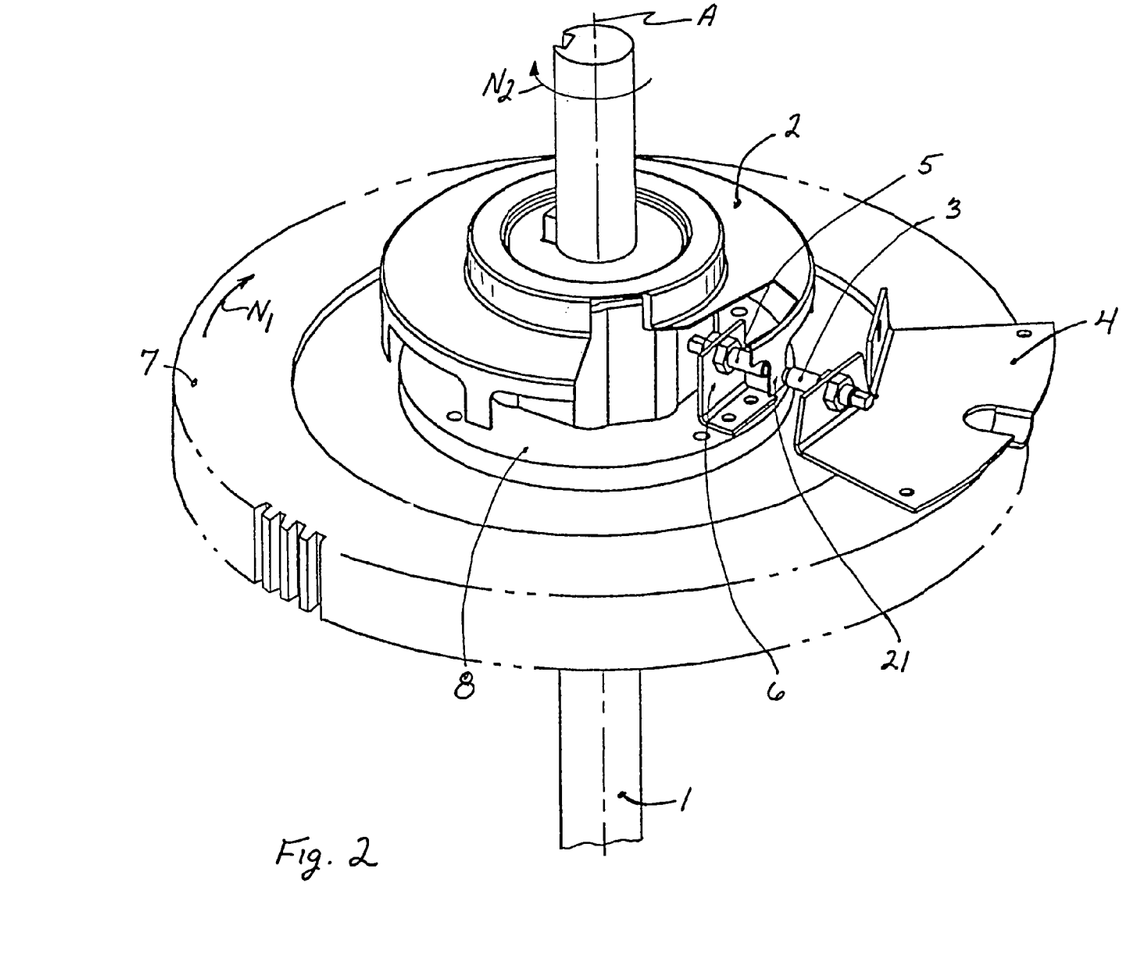
FIG. 2 is a top perspective view of the clutch slippage detection system of this invention, showing the shielded mode.

Referring now to FIGS. 1 through 9, a rotor shaft 1 protrudes vertically through a cylindrically shaped clutch 10. The rotor shaft 1 is affixed by key slot 11 (see FIGS. 2 and 9) to the internal hub 102 of clutch 10 (see FIG. 8c), and the hub can ratchet within the external housing 8, which is the driven portion of clutch 10. A cover shield 2, shown with broken view in FIGS. 1 and 2, is fitted over the top end of rotor shaft 1 and is keyed to rotate in engagement with rotor shaft 1 (see FIG. 9) at the same absolute RPMs ($N_2$) and within the same axis of rotation A (FIG. 1). Cover shield 2, along its periphery, is defined by downwardly extending fins 21 at regular intervals.

The external housing 8, forms the outside of clutch 10, and has mounted to its bottom, the rotor drive gear 7, and has affixed at its edge an actuator support 6, which carries actuator 5. These components all rotate together, biased against clutch internal ratcheting mechanism 102 (see FIGS. 8 and 9). All share the same absolute input drive RPMs ($N_1$) rotating in the axis of rotation A, from the power delivered via the drive gear 7.

When the rotor assembly 200 (see FIG. 9) and thus, the rotor shaft 1, are rotating freely and without fault, the $N_1$ and $N_2$ are equal. However, when the rotor shaft 1 encounters an abnormal load or slows down due to rock, debris or branches caught in the rotor spindles, the $N_1$ $_{and\ N2}$ no longer are equal because the clutch hub 102 starts to slip within the housing 8 as springs 103, which load pins 104, release, leading to ratcheting sounds. That is, as the rotation of rotor shaft 1 hangs up, the clutch hub 102 begins to ratchet against the torque, of the clutch external housing 8, provided by drive gear 7.

The internal ratcheting hub 102 of the clutch allows a limited number of stops "n", via pins 104, which stops are preferably keyed to coincide with each of the fins 21 of the shield 2, so that each stop "n" position allows one of the fins 21, going at rate $N_2$, to shield the actuator 5 when it rotates at $N_1$ equals $N_2$. The cover shield 2 and hub 102 are keyed to the rotor shaft 1.

A bracket 4 is fixed on the drum chassis 201 so as not to rotate. The bracket 4 supports a reed switch sensor 3 mounted to said bracket 4 so as to face the actuator 5, for at least a certain minimum interval, during every revolution of the drive gear sprocket 7 and clutch housing 8. Thus when $N_1$ $_{and\ N2}$ are equal, the ratchet system of the clutch hub 102 is most preferably at a stable position and therefore actuator 5 is shielded from sensor 3, by one of the fins 21, and, as such cannot be activated until $N_1$ does not equal $N_2$.

Figure 3:
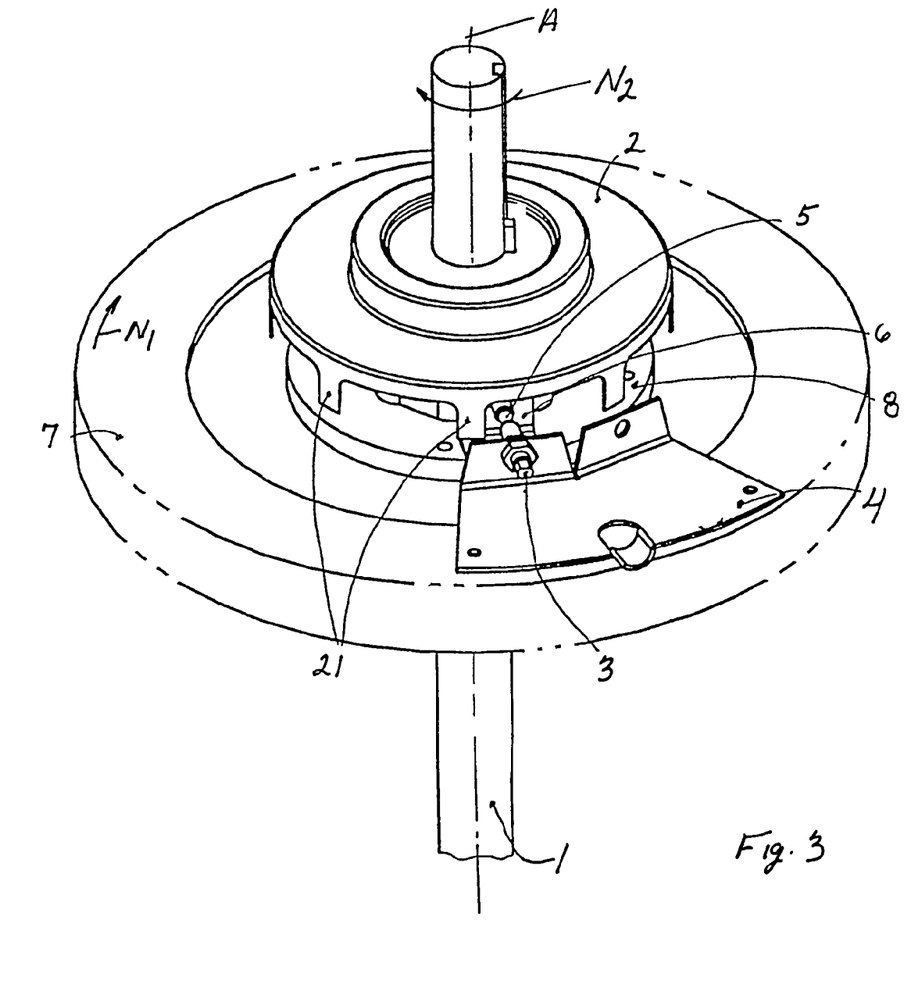
FIG. 3 is also a top perspective view of the clutch slippage detection system of this invention, but showing the unshielded mode as the drum is in the fault condition.

Referring more particularly to FIG. 3, a fault condition is shown, i.e. when $N_1$ does not equal $N_2$. The rotor shaft 1 is encountering an excessive load, and the hub 102 of clutch 10 is slipping and ratcheting and the magnetic flux's pathway from actuator 5 to sensor 3 is unshielded by virtue of the fins 21 moving out of the pathway, allowing the magnetic field emitted at actuator 5 to contact the reed switch sensor 3. The sensor 3 is thus enabled to send a fault signal. The signal is strong and can drive a load ranging from 250 milliamps to 1 amp, depending on the size of the reed switch sensor 3. For example, the signal can drive an indicator light 300 (see FIGS. 5a, 5b, 5c and 6) that will blink, indicating to the operator that there is a problem at the rotor in question.

Figure 5A:
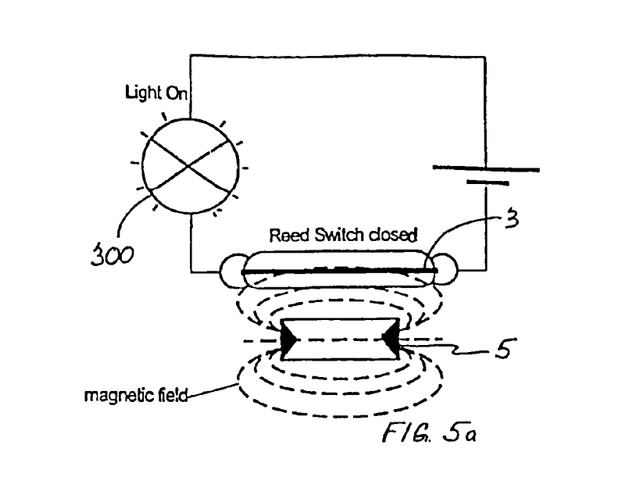
FIG. 5a–5c are illustrations of reed switch modes a) actuated (unshielded), b) unactuated by virtue of being out of range, and c) unactuated by being shielded.
Figure 5B:
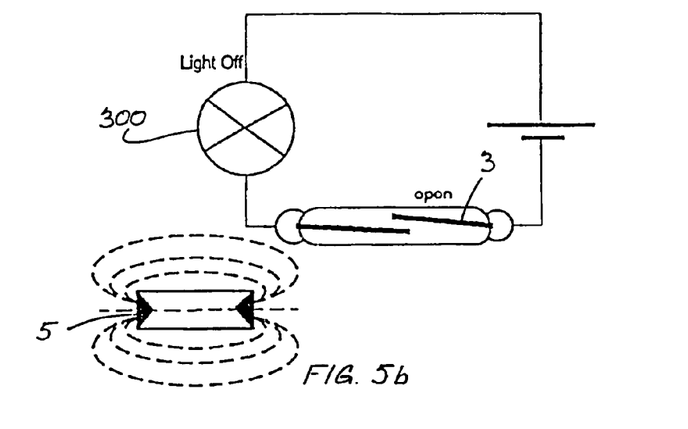
Figure 5C:
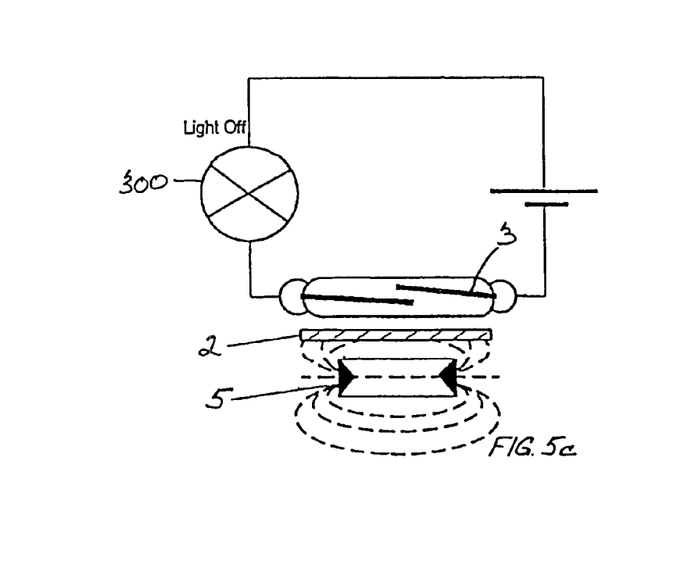

FIG. 5(a) graphically illustrates the reed switch sensor's (3) actuated mode for the unshielded position where the circuit is closed and a light 300 indicates warning that the clutch is slipping. At FIG. 5(b) the state of the switch changes, opening the circuit and the light 300 shuts off by virtue of the actuator's (5) magnetic field being out of range of the sensor (3). FIG. 5(c) shows an open circuit also, but it is open by virtue of the actuator 5 being shielded from its sensor (3) by shield (2).

Figure 4:
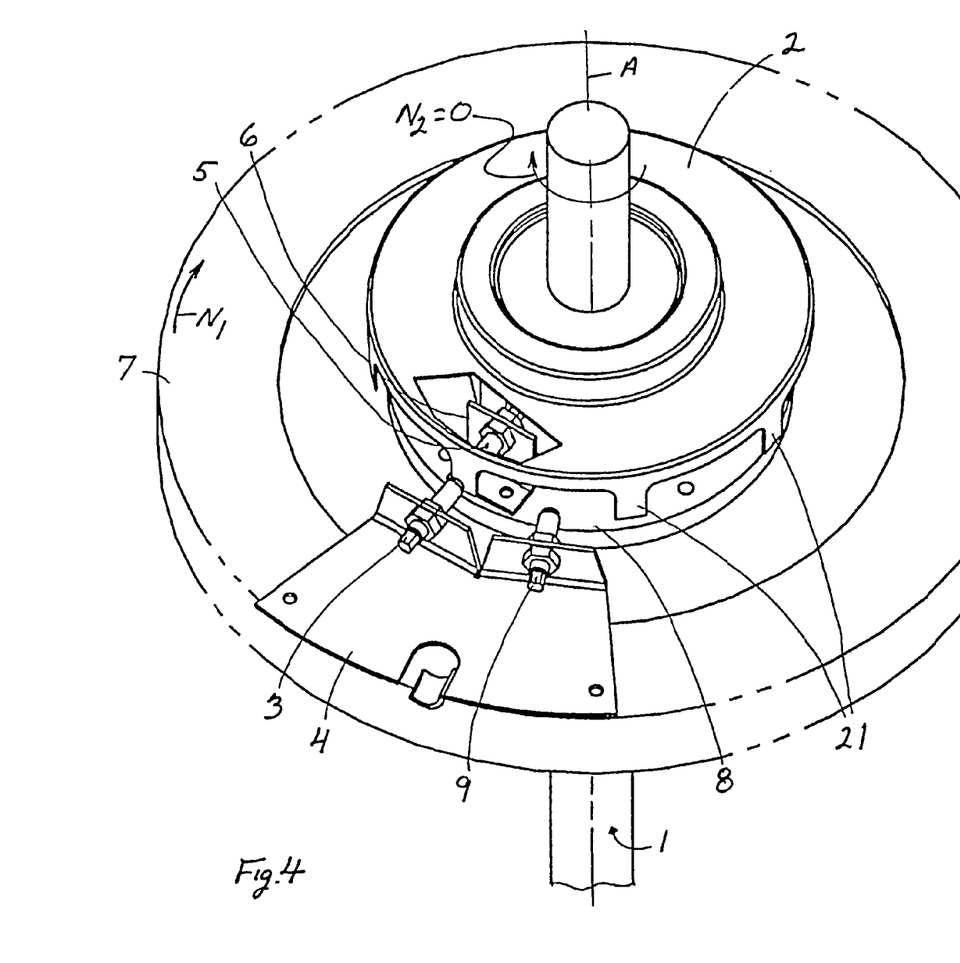
FIG. 4 is another top perspective view of an embodiment of the drum clutch slippage system of this invention which illustrates an auxiliary sensor.
Figure 6:
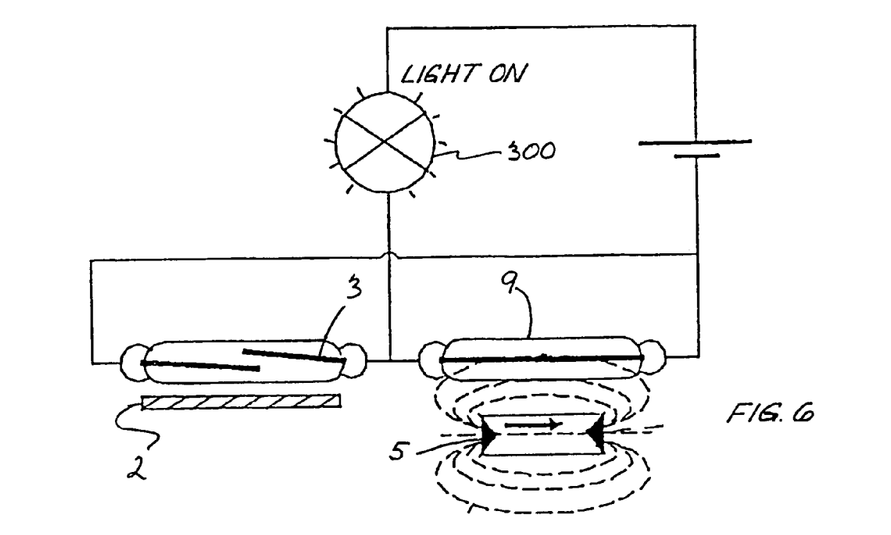
FIG. 6 is an illustration of the worst case scenario with an auxiliary sensor.

Referring now to FIGS. 4 and 6, an especially preferred embodiment of the present invention comprises a second sensor 9 mounted onto bracket 4. Sensor 9 is a fail-safe element for the worst case scenario when $N_2=0$, which means that there is complete blockage of rotor shaft 1. That is rotor shaft 1 has completely stopped. One of the fins (21) on cover 2 is stuck at a position shielding sensor 3, while the sprocket 7 is still spinning at $N_1$ RPMs which is not zero. The actuator 5 continuously passes near sensor 3 but is shielded from actuating it. The fault situation would be undetected but for sensor 9 which is clear to receive the magnetic signal when actuator 5 passes near by during revolution. FIG. 6 illustrates the open circuit at sensor 3 but successfully closing sensor 9.

Figure 7:
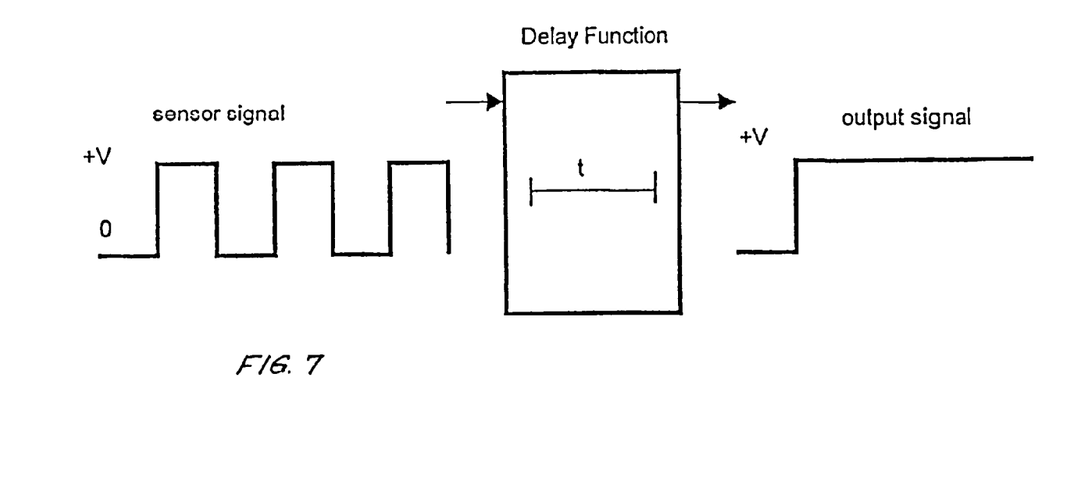
FIG. 7 is a graph of the sensor signals of the present invention.
Figure 8A:
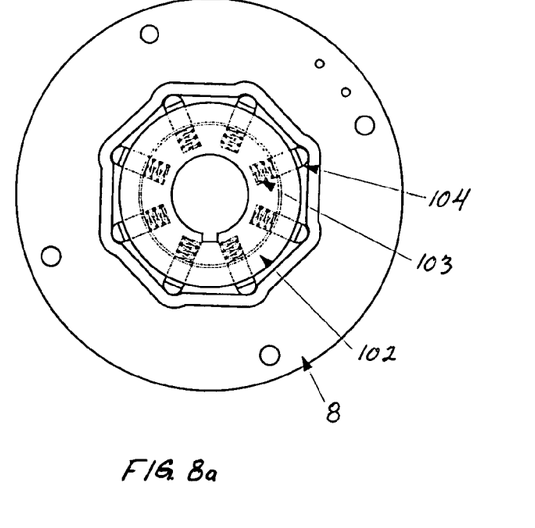
FIG. 8a is a top view of the drum clutch of the present invention without either the reed switch or the magnetic actuator.
Figure 8B:
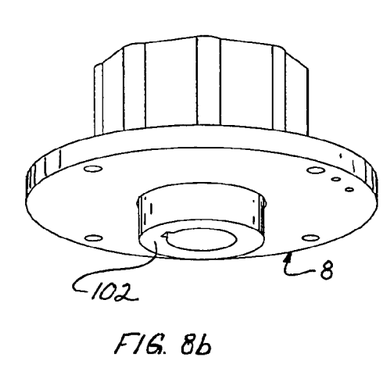
FIG. 8b is a perspective view of the drum clutch.
Figure 8C:
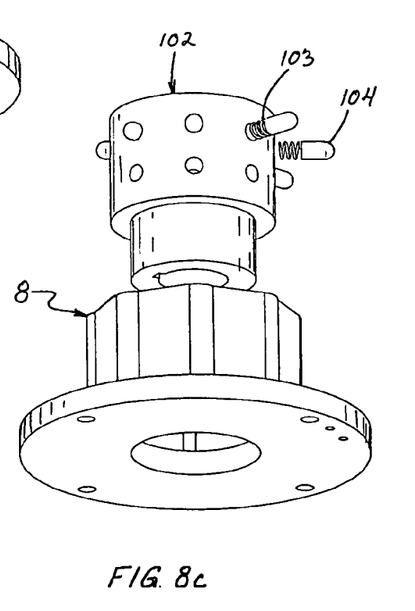
FIG. 8c is a perspective view of the drum clutch having its hub portion separated from the external drive portion.
Figure 9:
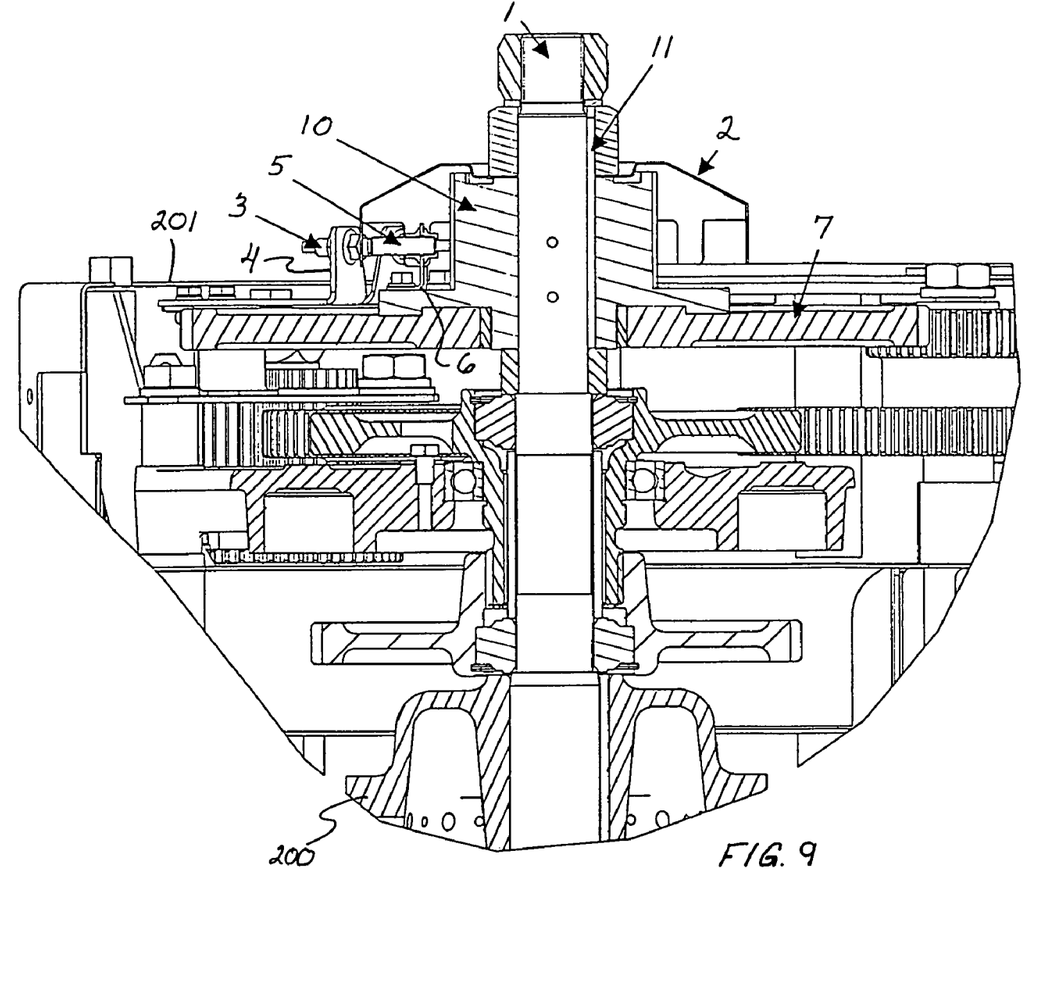
FIG. 9 is a from cross-sectional view of the clutch and top portion of the rotor assembly.

Referring now to FIG. 7, a simple delay function is used to produce a signal that can be buffered to drive a variety of kinds of loads. The cost of producing this system, including the process controller mechanism is substantially less than prior art systems.

What is claimed is:

1. In agricultural equipment, construction machinery, machine tool, or appliances, including an over running clutch having an input connected in rotatably driven relation to a source of rotatable power, and an output connected in rotatably driven relation to rotatable elements of a picking unit, the input and output being jointly rotatable along a path of rotational movement when the input and output are engaged such that the power source will rotate the rotatable elements at a desired rotational speed, and the input and output being rotatable one relative to the other along the path of rotational movement in an over running condition, and the improvement comprising;

a sensor operable in a first state when a predetermined magnetic field is absent, and operable in a second state when the predetermined magnetic field is present;

a magnetic actuator mounted near a first of the input or the output and operable for emitting the predetermined magnetic field; and a shield disposed on a second of the input or the output in a position for shielding the sensor from the actuator when the input and the output are jointly rotating in the normal condition, and such that when the input and the output are in the overrunning condition the shield will be at least intermittently positioned to allow the sensor to be sufficiently exposed to the magnetic field to change the state of the sensor.

2. In a vertical cotton harvester drum, of the type having a rotor shaft keyed to and extending up through an internal slippable hub portion of a slip clutch, and an input drive mounted to an external drive housing portion of the slip clutch; the improvement comprising: a non-contact system for instantaneously detecting when the clutch slips or overruns, which system comprises a fixed magnetic actuator and at least one reed switch sensor and shield assembly located at the clutch and changes states at the instant the clutch slips, the at least one reed switch sensor is fixed upon an appendage extending from the external drive housing portion, the actuator is opposite the at least one reed switch sensor which actuator transmits a magnetic field there-between, the at least one reed switch sensor and the shield assembly extending radially from the internal slippable hub portion so as to block the magnetic field between the at least one reed switch sensor and the actuator until the clutch slips, the shield assembly having a series of spaced apart openings, and the shield assembly is disposed such that as the clutch faults, the shield assembly revolves to a position exposing the actuator and the at least one reed switch sensor, face-to-face through one or more of the series openings, thereby changing the state of the reed switch sensor instantly, and allowing clutch slippage to be thereby detected without the need for sensing speed differential between other shafts nor comparing or averaging adjacent rotor shaft assemblies.

* * * * *